Jan. 5, 1954  S. A. HERRES  2,665,318
ARC MELTING OF TITANIUM TO FORM INGOTS
Filed July 21, 1950  5 Sheets-Sheet 1

INVENTOR.
Schuyler A. Herres
BY Thomas G. Miller
FOR Green, McCallister & Miller
HIS ATTORNEYS Jan. 5, 1954 S. A. HERRES 2,665,318
ARC MELTING OF TITANIUM TO FORM INGOTS
Filed July 21, 1950 5 Sheets-Sheet 2

INVENTOR.
Schuyler A. Herres
BY Thomas G. Miller
FOR Green, McCallister & Miller
HIS ATTORNEYS

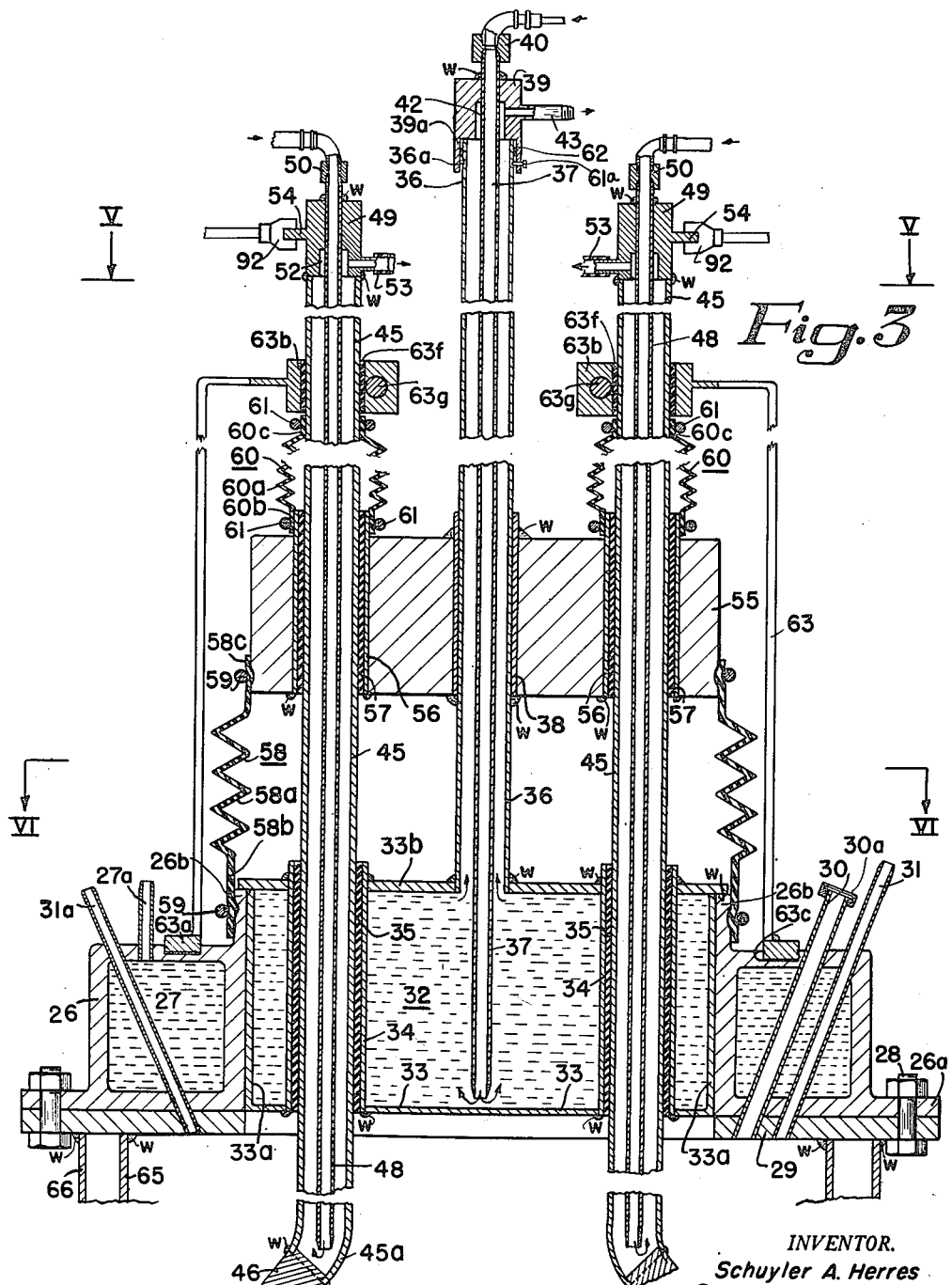

Jan. 5, 1954　　　　　S. A. HERRES　　　　　2,665,318
ARC MELTING OF TITANIUM TO FORM INGOTS
Filed July 21, 1950　　　　　　　　　　　　　　　　5 Sheets-Sheet 4

INVENTOR.
Schuyler A. Herres
BY Thomas G. Miller
FOR Green, McCallister & Miller
HIS ATTORNEYS

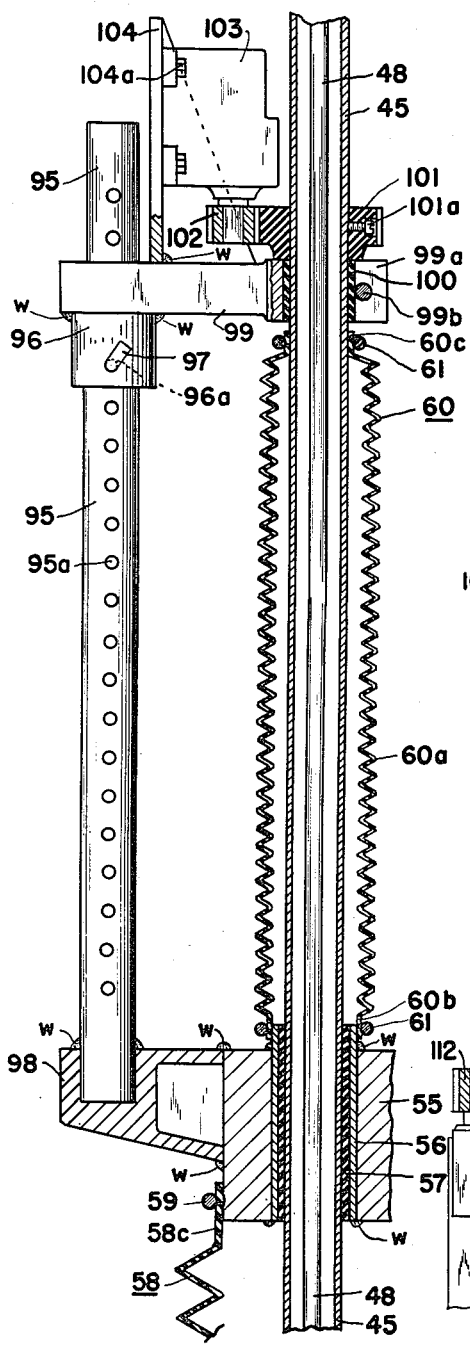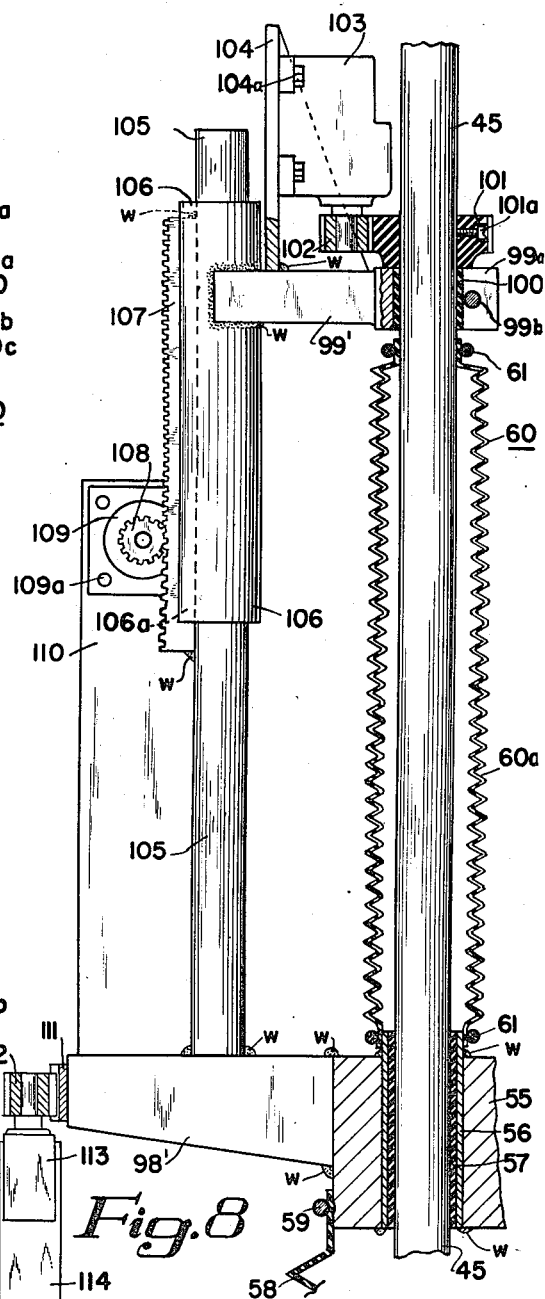

Patented Jan. 5, 1954

2,665,318

UNITED STATES PATENT OFFICE 2,665,318

ARC MELTING OF TITANIUM TO FORM INGOTS

Schuyler A. Herres, Albany, N. Y., assignor to Allegheny Ludlum Steel Corporation, Brackenridge, Pa., a corporation of Pennsylvania Application July 21, 1950, Serial No. 175,091

14 Claims. (Cl. 13—14)

1

This invention relates to electric arc-melting of metal and particularly, difficultly reducible metals, such as titanium, to form ingots. One phase of my invention relates particularly to means for controlling the heating or melting action of electrodes employed in forming metal ingots.

Titanium, zirconium and other similar metals have a relatively high melting point, and are extremely sensitive to contaminating materials and particularly, to contaminating gases. In the arc melting of previously substantially reduced titanium supplied in sponge-like particle or granular form, difficulty is encountered not only in avoiding a contamination of the metal during the melting operation, but also in controlling the operation so that all of the particles or granules are melted down to form a compact metal ingot of such characteristics that it can be rolled or worked into desired shapes. The difficulties encountered in forming ingots from ordinary metals and alloys are well known. For example, it is important to avoid segregation, pipes and other defects in the ingot which limit the amount of metal of the ingot as formed which can be utilized and necessitate rejects, expensive grinding, excessive waste metal cuts, and other operations. These latter difficulties become of still greater importance in melting titanium, due to the higher melting temperature required, measures necessary to protect the furnace walls from the heat generated and to prevent metal used in such walls from contaminating the titanium, the nature of the material as supplied for melting, and its extreme sensitivity to contamination by oxygen, nitrogen and other atmospheric gases.

In carrying out my present invention, I utilize means for controlling the melting of a metal such as titanium and its base metal alloys and for controlling the formation of ingots therefrom. A jacketed head carries electrodes that are adjustably mounted therein. Such electrodes are provided with means for maintaining them in a sealed-off relationship with respect to ambient atmospheric gases while permitting their adjustment or movement.

It has thus been an object of my invention to provide a practical solution to the problem presented in forming metal ingots of titanium;

Another object has been to devise means for controlling the arc melting heat applied to the top of the ingot and to the metal particles so as to progressively build up the ingot with fully melted metal across its diameter and of substantially uniform and desired characteristics;

A further object has been to devise means for more efficiently and effectively controlling the melting-down of metal to form ingots;

A still further object has been to provide means for adjustably positioning melting arcs in an ingot-forming furnace, wherein a single arc may be rotated, and wherein a series of spaced arcs may be rotated about the upper surface of the ingot as it is being formed and particularly, without contaminating the furnace atmosphere;

These and many other objects of my invention will appear to those skilled in the art from the illustrated embodiments thereof and the claims.

In the drawings, Figure 1 is a view in sectional elevation showing an upper half of a furnace apparatus constructed in accordance with my invention;

Figure 3 is an enlarged fragmental sectional view in elevation of an electrode head construction shown in the upper part of Figure 1;

Figure 7 is an enlarged fragmental section showing means for adjusting the vertical positioning of the electrodes and a motor driven mechanism for turning or rotating them in their mounts;

Figure 8 is a view similar to Figure 7, but shows a motor driven mechanism for raising and lowering the electrodes and a motor driven mechanism for turning or rotating the electrodes as a group.

In accordance with my invention, substantially reduced (pure) metal in the form of sponge-like or porous granules or particles is supplied from a gas-tight hopper 10 in controlled or weighed amounts to an upper furnace chamber C. A plurality of electrodes are adjustably supported in a head construction in such a manner that each electrode can be adjusted longitudinally or vertically to retract it as an ingot is built up in a melting chamber D from the metal introduced into the chamber C. Also, each electrode is mounted, so that it can be turned or rotated 360° during the melting operation; the series of electrodes can also be turned 360° as a group or unit. The head is provided with cooling means and the electrodes and the parts of the head are provided with flexible or resilient (expansible and contractible) sealing means which permits the above-mentioned movements of each individual electrode, as well as of the head, without breaking the atmospheric seal provided thereby. As a result, atmospheric and contaminating gases are excluded from the furnace in an effective manner and irrespective of the high operating temperature of the furnace. Each electrode is provided with a flexible current supply connection to permit its movement, is supplied with cooling fluid through flexible tubing, and has an out-turned tip which normally points towards the side walls of the furnace. Although the furnace is water jacketed, it is so constructed that its outer shell may be readily removed and a formed ingot taken from its bottom end.

The sealing means which permits the rotation and longitudinal movement of the individual electrodes, as well as the unitary movement of the electrodes as a group, is believed to be an important feature of my invention in that it positively seals the various parts, but at the same time, permits desired movement thereof in accordance with which the metal is fully and substantially uniformly melted down and a much better ingot results.

Figure 1:
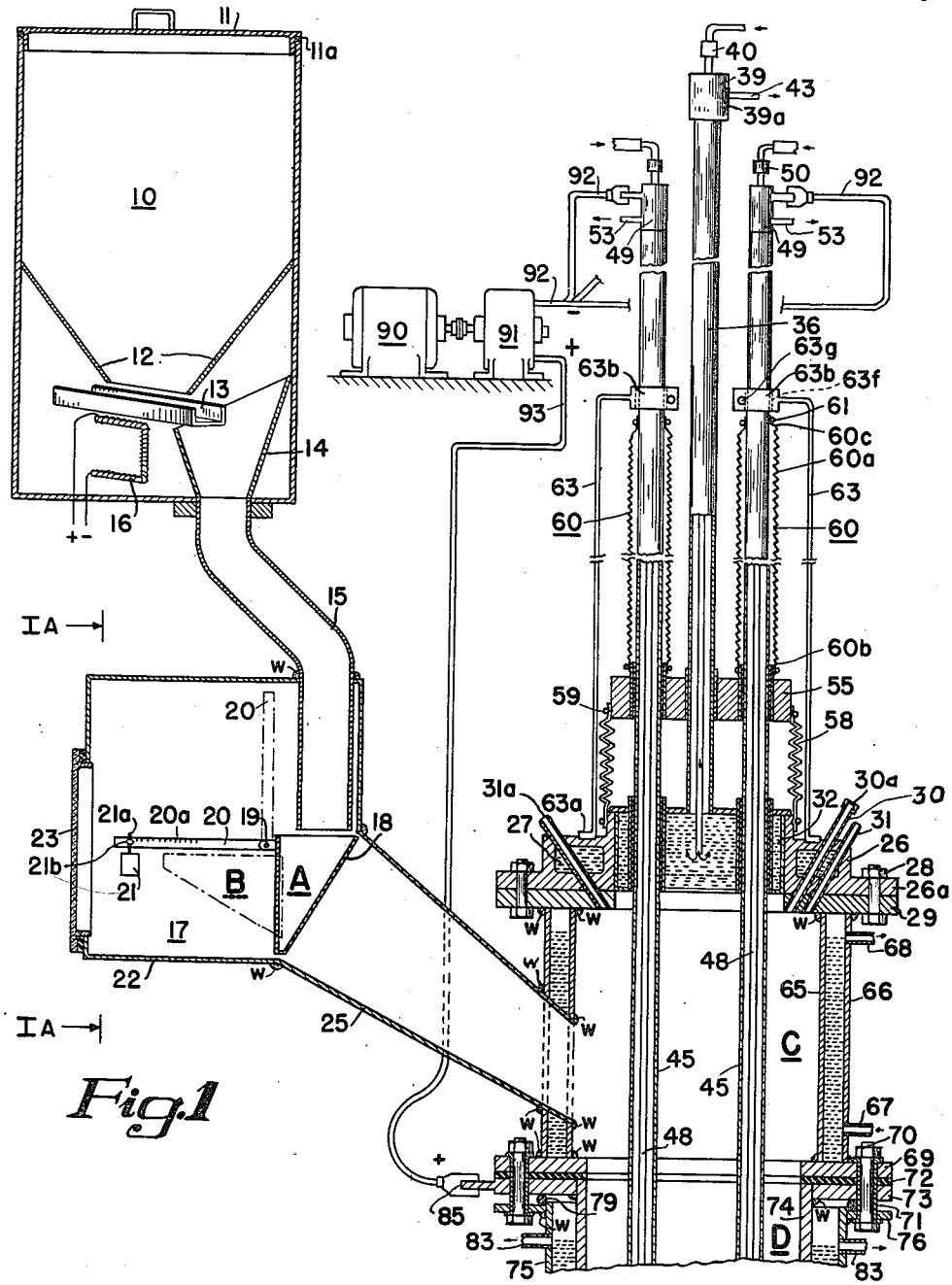
Figure 1A is a sectional detail taken along the line IA—IA of Figure 1 and showing the construction of a weighing device for the metal being introduced.

Referring particularly to Figure 1, the hopper 10 is shown provided with a removable lid 11 which tightly fits into its open top. Sealing gasket material 11a is interposed therebetween. The metal particles are guided by a pair of downwardly-converging chute walls 12 which discharge them upon a metallic, U-shaped member or channel 13. The metal material is advanced in usable, controlled amounts towards the opening of a discharge chute or funnel 14 by a synchro-vibrator electromagnet 16 which actuates the member 13.

Figure 1A:
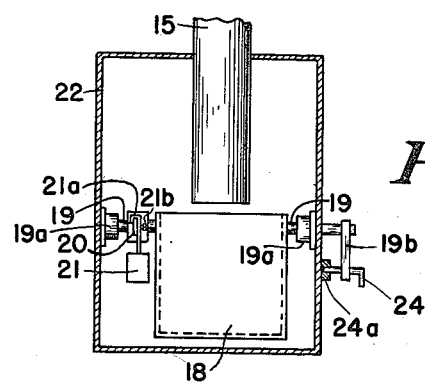

The chute 14 receives the metal delivered from the vibrator and delivers it through piping 15 to a sealed-off weighing device 17. The device 1 has an enclosure 22 provided with a tight-fitting, gasketed, clear glass or plastic inspection door 23. A V-shaped weighing or dump member 18 is adapted to receive the metal material at position A, to weigh it, and then turn on its pivot shaft 19 to position B and discharge the material through a chute 25 to the furnace chamber C. The shaft 19 is journaled in bearings 19a that are positioned on opposite side walls of the enclosure 22. One end of the shaft 19 extends through a sealing gasket to project beyond one side wall of the enclosure 22 and has a latch arm 19b, see Figure 1A. A locking pin 24 is adapted to extend through the arm 19b and to be removably positioned in a latch 24a that is secured to the enclosure. Thus, the dump member 18 may be retained in a material-receiving position when desired and until the pin 24 is pulled out. A lever or balance arm 20 extends backwardly from the dump member 18 and has graduations 20a therealong on which a weight 21 and its loop portion 21a are adapted to be adjusted. A set screw 21b holds the loop portion securely in an adjusted position on the lever arm 20. It will thus be apparent that a requisite or controlled delivery of the metal may be effected by loosening the set screw 21b and properly adjusting the weight 21 along the graduations of the lever arm 20, so that the member 18 will tilt to the position B when the proper amount of metal has been collected. The delivery chute 25 is inclined downwardly from and welded at w to the enclosure 22, it also is welded or brazed at w to wall portions of the delivery C of the furnace and is entrant thereto.

The furnace has an electrode head construction which consists of a water-jacketed furnace top ring flange member 26, a lower, water-jacketed support and circular centrally-disposed closure head part 32, and an upper support head part 55 through which electrode tubes 45 extend.

Figure 6:
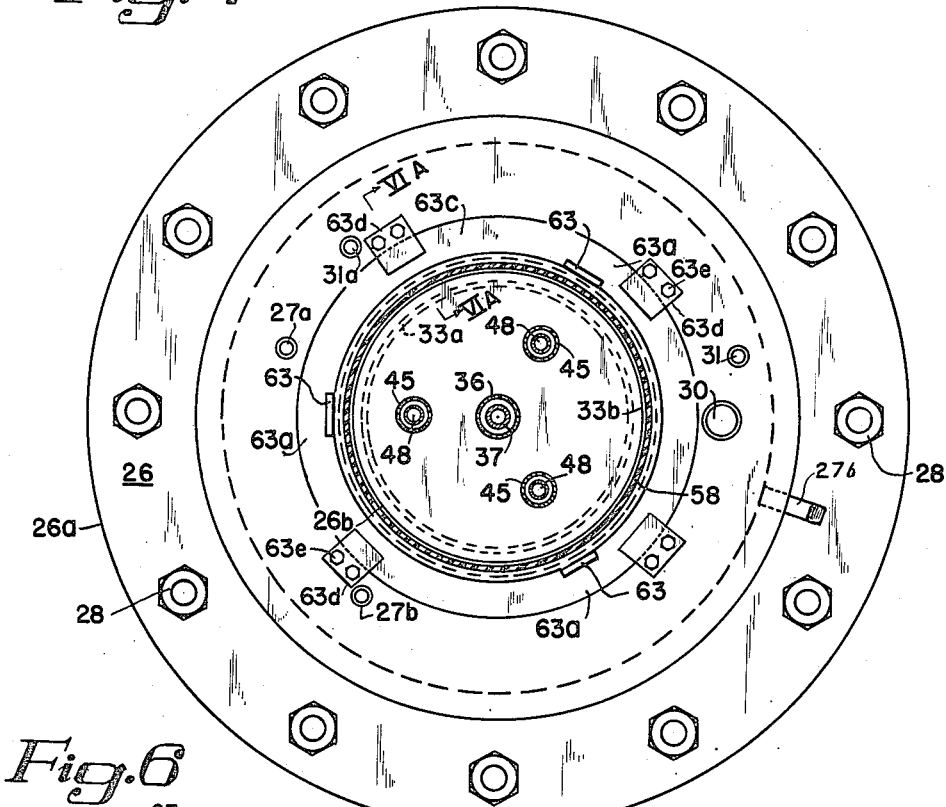
Figure 6 is a horizontal section taken along the line VI—VI of and to the scale of Figure 3.

The flange member 26 has an outer flange portion 26a through which a nut and bolt assembly 28 is adapted to extend to secure it to an immediate, integral top support flange 29 of the upper chamber C of the furnace. The flange member 26 also has wall portions which project upwardly and define a cooling chamber 27 about a central opening therethrough. As shown in Figures 3 and 6, warm water may be exhausted from the chamber 27 through outlet 27a and cool water introduced through inlet 27b. The lower or closure head part 32 is turnably or rotatably positioned within the central opening of the member 26 and has an upper or top wall member or plate 33b, see Figure 3, whose outer edges rotatably rest upon top edges of an upwardly extending annular rim portion 26b which also defines the central opening through the member 26. A bottom wall 33 is integral with side walls 33a which abut and rotatably bear upon the upwardly-extending hole-defining wall portions of the flange member 26. The top wall member 33b is welded at w to integral side wall portions 33a and like the bottom wall portion 33, has a series of peripherally-spaced-apart, electrode receiving, openings therethrough as defined by vertical wall pieces, sleeves, or tubes 34. The wall pieces or sleeves 34 are welded at w to the top and bottom wall portions 33b and 33 to form an integral connection therewith. Bearing sleeves 35 of Micarta or any suitable heat-resistant insulating material are carried by each of the sleeve-like, vertical wall pieces or tubes 34 may be cemented thereto for rotatably and slidably positioning the electrodes 45 therein.

I provide means for introducing and exhausting fluid to the cooling fluid chamber defined by the lower or closure head part 32 which comprises an upwardly or vertically-longitudinally extending outer, centrally located tube 36 secured at its lower end by weld metal w to the top wall portion 33b and encircling an inner tube 37. The tube 36 also extends upwardly through a central opening in a top head part 55 and is welded to a support sleeve 38 which is in turn welded to the head part 55. The inner or fluid delivery tube 37 is adapted to extend concentrically along and in a spaced relationship with the walls of the fluid return, outer tube 36, downwardly to a point adjacent the bottom of the chamber defined by the lower or closure head part 32. A closure cap 39 has a downwardly-extending sleeve portion 39a which rotatably carries the upper end of the tube 36, see Figure 3. One or more set screws 61a are carried by the cap sleeve portion 39a and ride in an annular groove portion 36a of the tube 36 to hold the tube in position within the sleeve portion 39a. A gasket 62 prevents fluid leakage. The inner, fluid delivery tube 37 extends upwardly through the cap 39, is secured thereto by weld metal w, and is coupled to a fluid supply connection 40 for introducing cooling fluid downwardly therealong, as indicated by the arrows of Figure 3, and out of its open end into the chamber of the lower head 32. Warm fluid is exhausted from the top of the chamber of the head 32 along the spacing provided between the outer tube 36 and the inner tube 37, and through a bore 42 in the cap 39 and a nipple portion 43. In this manner, a continuous supply of cooling fluid may be introduced into the chamber of the lower or closure head 32 and when heated, exhausted therefrom. This keeps the bearings 35 as well as the walls of the electrodes 45 at a proper temperature such that damage to them will be avoided and freezing prevented.

Each electrode tube 45 is of longitudinal form and may be of a suitable metal such as copper. Each electrode tube 45 has an outwardly-bent or turned gooseneck or nose 45a at its lower, open end within which a welding tip 46 is mounted to extend. The tip 46 may be of a suitable high temperature, non-contaminating metal or material, such as tungsten or a tungsten alloy and is brazed at w to the walls of the electrode tube extension or nose 45a. Each electrode tube 45 is provided with a concentrically-extending cooling-fluid-introducing, inner tube 48 which extends downwardly therealong to its tip 46 and at its upper end extends through a cap 49 and a coupling 49 to a fluid supply connection. The upper end of each electrode tube 45 is secured to the cap 49 by weld metal w. The cap 49 has a bore 52 and a transverse outlet passageway to a fluid connection 53, so that cooling fluid may be circulated as indicated by the arrows, downwardly through the inner tube 48, upwardly along the spacing between the walls of the inner and outer tubes of the electrode, through the bore 52 of the cap 49, and out through the passageway connection 53. The cap 49 also has a connecting lug portion 54 to which a current supply lead 92 may be secured. In order to permit each electrode 45 to be raised and lowered as well as rotated, the fluid connections to 50 and 53 and the current connection to 54 are of flexible construction. For example, rubber tubing may be used for the connections to 50 and 53 and a flexible wire or a wire braid cable employed for the electrical lead 92.

The upper head part 55 is carried on the fluid return tube 36 and has a series of peripherally spaced-apart openings therein through which the outer electrode tubes 45 are adapted to extend. An outer sleeve 56 is welded at w to extend through each of such openings and carries an inner bearing sleeve 57 of insulating material such as Micarta which slidably and rotatably supports each electrode tube 45 therein. It will be noted that the sleeves 56 and 57 extend above the upper face of the upper head 55 to provide a support for one end of a sealing means 60 which will be hereinafter described.

A sealing means 58, preferably of a synthetic, heat-resisting rubber, has a series of convolute, offset, ring-like, or bellows-like portions 58a and cylindrical end portions 58b and 58c. The sealing means or tube is of relatively thin, but tough-wall construction, so that it can be turned about its portions 58a without damage to it or without breaking the fluid seal provided thereby. The lower cylindrical portion 58b is cemented about an outer surface of the rim 26b of the closure plate member 26 and is securely and tightly held in abutment therewith by a wire clamping band 59. In a like manner, the upper cylindrical flange portion 58c is sealed about the outer surface of the upper head part 55 by a suitable rubber cement and is securely held in position thereon by a wire band 59.

It will also be noted that each of the electrode tubes 45 has a sealing means 60 of somewhat similar construction to the means 58, but of slightly less thickness and greater length. Each of these means 60 also has convolute, offset, or bellows-like portions 60a which permit rotation as well as vertical movement of the electrode 45 without damage to the seal. The opposite ends of each sealing tube 60 terminate in cylindrical flanges 60b and 60c. The lower flange 60b is cemented about the upper extending end of the metal sleeve 56 and is securely held thereon by a wire clamping band 61. The upper cylindrical portion or flange 60c is in a like manner cemented about the outer wall of the electrode tube 45 and securely held thereon by a wire clamping band 61.

The fluid connections to 40 and 43 of the head 39 need not be of flexible or rubber construction, since the cooling tube 37 is adapted to rotate within the sleeve 39a of the cap 39. It will be noted that the tube 36 supports the upper head 55 and is adapted to rotate with it and the lower head 32 when the electrode tubes 45 are to be rotated or turned as a group within the ring flange member 26 and within the convolute portions 58a of the sealing means 58.

When the electrode tubes 45 are to be turned individually within the head parts 32 and 55, this is accomplished about the bearing sleeves 35 and 57 and within the convolute portions 60a of sealing means 60.

Figure 6A:
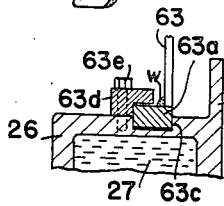
Figure 6A is a sectional detail taken along the line VIA—VIA of Figure 6.

As shown in Figures 3, 6 and 6A, support members 63 are at their lower ends secured by weld metal w to a ring foot portion 63a that is rotatably-slidably mounted in an annular, depressed track 63c. The track 63c is formed or grooved in a top surface of the top closure member 26. Each member 63 has at its upper end a split-sleeve clamp bracket portion 63b. Each bracket portion 63b carries an insulating sleeve 63f and is adapted to be clamped to one of the electrode tubes 45 by a thumb nut and bolt assembly 63g. When the assembly 63g is loosened, the tube 45 may be raised, lowered, or turned with respect to the bracket 63b. The support members 63 are adapted to turn about the grooved track 63c when the electrode tubes 45 are being turned as a group. A series of clips 63d and bolts 63e removably hold the ring portion 63a in position on the closure member 26, see Figure 6. When it is desired to move an electrode tube 45 vertically within its bearing sleeves 35 and 57, the sealing means 60 is expanded or compressed without breaking the seal provided thereby. In this manner, the electrodes can be advanced at the beginning of a melting operation to the bottom of the furnace chamber D (see Figure 2) and then as the welding operation progresses, raised until an ingot E has been completely formed.

Figure 2:
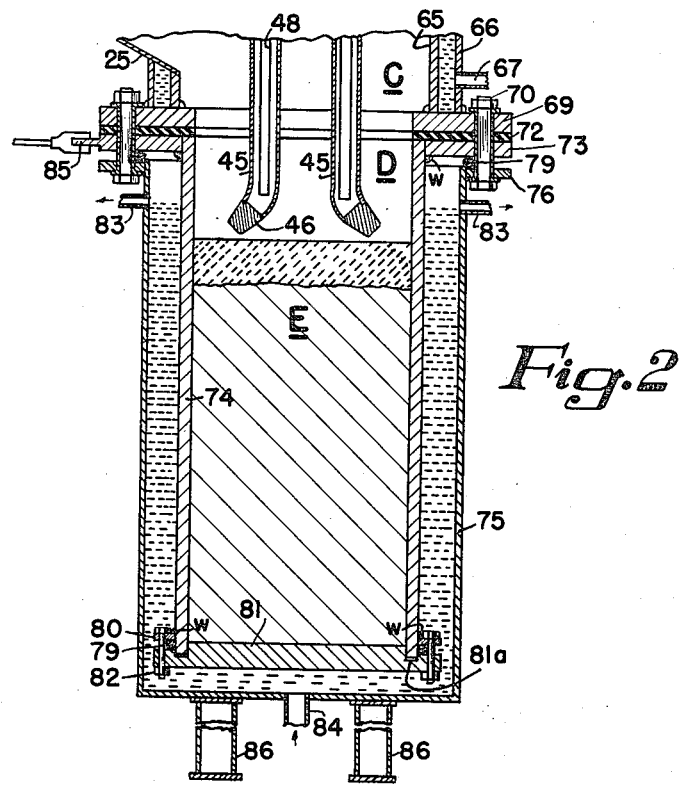
Figure 2 is a sectional view in elevation completing the view of Figure 1 and showing a bottom half of the apparatus.

The upper or feed chamber C, see Figures 1 and 2, has an inner copper wall 65 and a concentric, spaced-apart steel outer wall 66 which define a fluid chamber therebetween. Cooling water may be introduced through an inlet 67 and exhausted through an outlet 68. The walls 65 and 66 are brazed or welded to the previously described, top flange 29 by metal $w$ at their upper edges and at their lower edges are brazed or welded to a bottom flange member 69.

The bottom flange member 69 is positioned on a temperature-resistant, electrical insulating washer 72 which rests upon an outwardly-extending top flange 73 of the melting chamber D. The flange 73 is of copper and is secured by brazing metal $w$ to an outer surface of a copper inner lining wall 74 of the melting chamber D. Bolt and nut assemblies 70 secure the flanges 69 and 73 together and are insulated therefrom by sleeves 71. The flange 73 has an electrical connection lug 85 for current lead 93.

An outer, concentric steel wall 75 is positioned about the inner wall 74 in a spaced relationship therewith to define a fluid chamber therewith. The outer wall 75 also has an outwardly-extending flange 76 secured thereto by weld metal $w$ and adapted to carry an annular heat-resistant, rubber, water-sealing ring 79. The flange 76 is held in a secured relationship with the flange 73 and both of these flanges with the top flange 69 by the bolt and nut assemblies 70 which extend therethrough.

Cooling fluid is supplied to the jacket chamber of the melting chamber D through a bottom inlet 84, see Figure 2, and is exhausted at its upper end through top outlets 83. A bottom plate member 81 of copper or copper alloy construction has an annular groove offset 81a to fit over bottom edges of the inner wall 74. The inner wall 74 has an outwardly-extending, bottom flange 80 brazed thereto at $w$ which is adapted to receive bolt and nut assemblies 82 which extend therethrough and through an outer flange extension of the bottom plate member 81. The member 81 is held in a fluid-sealed-off relationship with the wall 74 by a temperature-resistant annular gasket 79.

The apparatus is supported on removable furnace supports 86. When an ingot E has been formed, the bolt and nut assemblies 70 may be removed, and the crucible or inner wall 74 may be lifted out of the housing or outer jacket wall 75. The bottom plate member 81 may then be removed and the ingot E can then be pushed out of the crucible 74.

Figures 4, 5:
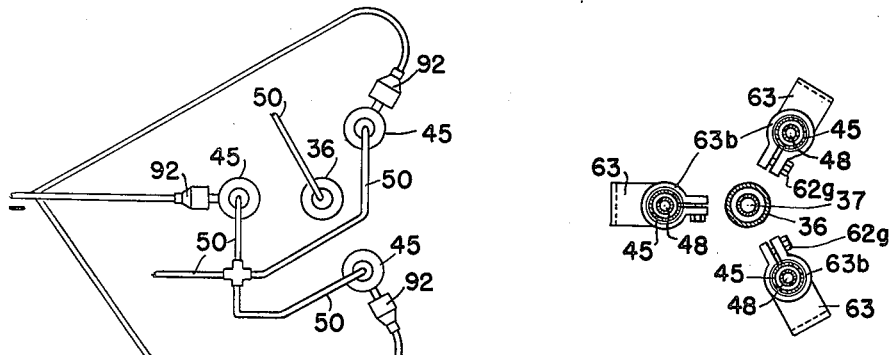
Figure 4 is a somewhat diagrammatic plan view showing electrical connections to the electrodes of Figure 1.
Figure 5 is a reduced horizontal section taken along the line V—V of Figure 3.

Welding current is provided by a motor 90 which drives a generator 91, as shown particularly in Figure 1. A negative terminal of the generator 91 is connected through flexible leads 92, see also Figure 4, to each of the electrode tubes 45. The positive terminal from the generator 91 is connected through lead 93 to the lug 85 of the flange member 73. It is thus apparent that an arc will be formed between the tips 46 of the electrodes and the metal in the melting chamber D.

I have been able to provide a more intense, efficient, and concentrated arc by reason of the fact that, as shown in Figure 2, the full upper surface of the ingot E is in a molten condition during the melting operation.

To supply a suitable gas to the chamber C, see Figure 1, I have provided an inlet tube 31 which extends through the ring flange member 26 and flange 29 and may be connected at its upper end to a suitable source of gas. If the metal material to be melted is substantially fully reduced, an inert gas such as argon will be employed; if the metal is only partially reduced, a reducing gas, such as hydrogen or a combination gas of argon and hydrogen, may be employed.

For exhausting gases from the chamber C, I have provided a tube 31a through an opposite end of the ring flange member 26. An auxiliary tube 30 is provided with a transparent sight-glass cap 30a.

In carrying out the procedure of my invention, I provide starting melted metal material on a dummy at the bottom of the furnace chamber D, initiate at least one melting arc between it and an electrode tip 46, and then feed in additional material in controlled or measured amounts such that the material will be fully melted down as it is fed. In addition, I direct each arc at an angle to the horizontal or transverse top surface of the ingot as the latter is being built up, change the pointed direction of the arc about its vertical or longitudinal axis, and change the relative position of each arc about the top surface of the ingot. Also, the arc relationship with the top surface is maintained substantially constant by withdrawing the electrodes as the ingot builds up. In this manner, heat can be concentrated adjacent the outer peripheral portions of the top surface to offset the cooling action of the jacketed furnace walls, to provide a complete melting down of the material, and a substantially uniform solidifying action beneath a fully molten top surface of the ingot. Full movement of each electrode arc and of the arcs as a group is effected without destroying the sealed-off relationship of the furnace chamber and thus, without contaminating the metal of the resultant ingot.

In Figure 7, I have shown a motor arrangement for rotating each tube 45 and means for providing it with adjusted vertical positions. In Figure 8, I have also shown a motor for mechanically raising and lowering each tube 45.

In Figure 7, a vertical support tube 95 is secured at its lower end to extend upwardly from a platform extension 98 of the upper head part 55, see weld metal $w$. The tube 95 is provided with a spaced series of latching holes 95a through it and is adapted to be slidably positioned at its upper end in a collar 96. A horizontal support arm 99 is secured to the collar 96 and has a bifurcated end portion 99a that carries an insulating sleeve 100. The portion 99a is securely clamped to the tube 45 by a clamping nut and bolt assembly 99b. The collar 96 is provided with a hole 96a therethrough to removably receive a latch pin 97 that is adapted to register with any one of the holes 95a of the support tube 95. A plastic gear 101 located above the arm 99 is secured to the tube 45 by a setscrew 101a to turn or rotate it. The gear 101 meshes with a motor pinion 102 which is driven by a reversible electric motor 103. The motor 103 is mounted by bolts 104a on a base plate member 104 that is secured to extend upwardly from the arm 99.

In Figure 8, a vertical support tube 105 is secured on the platform extension 98' and is slidably positioned within a vertically slotted collar 106 that is secured on the arm 99'. The tube 105 carries a gear rack 107 that is welded thereon at $w$ to extend along the vertical slot 106a in the collar 106. A motor pinion 108 meshes with the rack 107 and is driven by a reversible motor 109 that is secured by bolts 109a on a vertical base member 110. The member 110 is secured on the platform extension 98'. A gear flange 111 is secured about the periphery of the platform extension 98' and meshes with a motor pinion 112 that is driven by a reversible electric motor 113. The motor 113 is mounted on a base member 114 that is secured on the stationary ring flange member 26. The motor 113 is employed to turn the upper head 55 and the lower or closure head 32 through the connecting tube 36; in this manner all of the electrodes may be turned or rotated as a group.

From the above, it will be apparent that I have provided positive drive means for raising and lowering the electrodes 45, for turning each electrode separately, and for turning them as a group. If desired, the motors 103 for turning each electrode tube may also be synchronized and the motors 109 for raising each tube may also be synchronized.

What I claim is:

1. A furnace apparatus for melting down a high temperature, gas-contaminated metal to form an ingot which comprises, an upper furnace chamber defined by an inner, non-ferrous metal vertical wall, a bottom flange wall and a top flange wall; a lower non-ferrous inner vertical wall defining a lower ingot-receiving furnace chamber connected in a fluid sealed-off relationship to said bottom flange wall of the upper chamber and being open thereto through said bottom flange wall, a non-ferrous bottom member closing off the lower furnace chamber and removably secured to said lower inner vertical wall, outer ferrous metal walls about said upper and lower non-ferrous metal inner vertical walls in a spaced relationship with respect thereto, cooling fluid inlets and outlets to the spacing provided between said inner and outer vertical walls, a fluid jacketed lower head rotatably mounted within and supported by said top flange wall of the upper furnace chamber, a fluid-introducing and exhausting tube assembly connected to the fluid jacket of said lower head, an upper head supported in a spaced relationship with respect to said lower head on said tube assembly for rotation with said lower head, a series of tubular electrode assemblies rotatably and slidably positioned in a peripherally spaced-apart relationship to extend through said upper and lower heads into and along the upper furnace chamber and into the lower furnace chamber, each of said electrode tube assemblies having a tip secured to its lower end and closing it off, each said tip being turned outwardly from its said electrode tube assembly, a resilient expansible and contractible sealing means secured between said upper head and said top flange wall of the upper furnace chamber for permitting said upper and said lower heads to be rotated without spoiling the fluid sealed-off relationship with said top flange wall, a resilient expansible and contractible sealing-off tube mounted between each of said electrode assemblies and said upper head for sealing them off with respect to each other and maintaining such sealed-off relationship during rotatable and slidable movement between each electrode assembly and said upper head.

2. A furnace apparatus as defined in claim 1 wherein, a feed chute is connected and entrant to the upper furnace chamber through its said vertical walls, a metal supply hopper is connected to said chute, and a measuring device is operably interposed between said hopper and said chute for delivering metal to said chute in measured amounts.

3. A furnace apparatus as defined in claim 1 wherein, a motor is operably connected to said upper and lower heads for turning said electrode tube assemblies as a group, and a motor is operably connected to each of said electrode tube assemblies for raising and lowering them.

4. A furnace apparatus for melting down metal particles to form an ingot which comprises, a jacketed melting chamber, means for supplying current of one potential thereto, means for supplying metal particles in measured amounts to the chamber, electric arc-producing means of opposite potential operatively positioned to extend into said chamber, said arc-producing means having a turned-out tip pointing towards a side wall of said chamber to form an arc with and melt the metal particles supplied to said chamber, means for turning said tip about a top surface of the ingot, said tip being turned by turning said arc-producing means with respect to said chamber, and flexible tube means connected at its end portions with a positive fluid seal between said arc-producing means and said jacketed melting chamber to maintain a fluid seal therebetween when said arc-producing means is turned with respect to said chamber.

5. A furnace apparatus for melting down metal particles to form a metal ingot which comprises, walls defining a melting chamber, an electrode extending into the melting chamber to melt down the metal particles and build up an ingot therein, means for supplying current of one potential to said electrode and of opposite potential to metal in the chamber, said electrode having a heat-resistant electric arc-producing angular tip end within the chamber that is pointed towards a side wall of said chamber, means for turning said electrode about its longitudinal axis and said tip end and its arc about a top surface of the ingot being built up therein, and flexible tubing means having end portions connected with a positive fluid seal between said electrode and said walls to maintain a fluid seal therebetween when said electrode is turned with respect to the chamber.

6. A furnace apparatus as defined in claim 5 wherein, positioning means for said electrode is carried by said walls and is sealed off about said electrode by said tubing means, means is provided to raise and lower said electrode within said positioning means, and said flexible tubing means has expansible portions maintaining the fluid seal during the raising and lowering of said electrode.

7. A furnace apparatus for melting down metal to form an ingot which comprises, a top ring flange and walls defining a melting-down furnace chamber, means for introducing metal into the furnace chamber, said ring flange having a vertical wall defining a central opening therethrough, a closure head rotatably positioned within said vertical wall to close-off the central opening through said ring flange, said closure head having projecting edges resting upon top edges of said vertical wall to rotatably support said closure head thereon, electric arc-producing electrode means positioned by and extending through said closure head into the furnace chamber to melt down metal and build up an ingot therein, means for supplying current of one potential to said electrode means and of opposite potential to metal in the chamber, means for rotating said closure head and electrode means, and flexible sealing means having portions enclosing the joint between said closure head and said ring flange and having end portions connected between said ring flange and said electrode means with a positive fluid seal to maintain a fluid seal between said ring flange and said electrode means when said closure head and said electrode means are rotated with respect to said ring flange.

8. A furnace apparatus as defined in claim 7 wherein said closure head has walls defining a cooling fluid chamber therein, and a cooling tube assembly is connected at its lower end through a top wall of said closure head to the cooling fluid chamber defined thereby, said cooling fluid assembly having an outer tube secured to the top wall portion of said closure head and an inner concentric tube extending in a spaced-apart relationship along said outer tube to supply cooling fluid to and exhaust heated fluid from the chamber of said closure head, a second head is secured on an upper end portion of said cooling fluid assembly in a vertical space-defining relationship with respect to said closure head, said electrode means extends through said second head, and portions of said sealing means are connected and enclose the space between said closure head and said second head.

9. In a furnace provided with walls defining a melting chamber in which metal particles are to be melted down to build up an ingot therein, the combination of means for supplying metal particles in measured amounts to the melting chamber, a closure head rotatably mounted on the furnace walls to close-off an upper end of the melting chamber, said closure head having spaced-apart side and top and bottom wall portions defining a cooling fluid chamber therein, means connected to said closure head and open to the fluid chamber therein to supply cooling fluid to and exhaust heated fluid from the cooling chamber, a bearing sleeve extending through the cooling fluid chamber of said closure head and cooled by the fluid therein, said bearing sleeve being secured to the top and bottom wall portions of said closure head, an electric arc-producing electrode slidably positioned in said bearing sleeve and extending into the melting chamber to melt down metal particles and build up an ingot therein, means for supplying current of one potential to said electrode and of opposite potential to metal in the melting chamber, means for slidably retracting said electrode in said bearing sleeve while the ingot is being built up to maintain a substantially constant arc therewith, and an expansible sealing means having portions connected with a positive fluid seal between said electrode and the furnace walls to maintain a fluid seal therebetween when said electrode is being retracted with respect to the melting chamber.

10. A furnace as defined in claim 9 wherein, said closure head is rotatably mounted on the furnace walls to rotate said electrode within the melting chamber, said electrode has a turned-out arc-producing tip end within the melting chamber, and said expansible sealing means has portions closing off the joint between said closure head and the furnace walls on which it is mounted.

11. A furnace for melting down metal to form an ingot which comprises, walls defining a melting down furnace chamber, means about said walls for cooling them during the melting down operation, means for introducing metal into the furnace chamber, an upper head and a lower head in a spaced relationship, electrode means extending through said upper and lower heads into the furnace chamber, said lower head being rotatably mounted on a top portion of said walls, said upper head being secured to said lower head, said electrode means having a plurality of electrodes extending through said upper and lower heads into the furnace chamber, said electrodes being rotatably and slidably positioned within said heads, each of said electrodes having an angular tip portion extending therefrom within and towards side walls of the furnace chamber, flexible convoluted tubing sealing-off means having end portions secured between said upper and lower heads, said sealing-off means enclosing the spacing between said upper and lower heads, and flexible convoluted tubing sealing-off means for each of said electrodes and having end portions connected between said upper head and portions of said electrodes that are above said upper head.

12. In a high temperature melting furnace having water jacketed walls defining a melting chamber therein within which metal particles are to be melted down to build up an ingot, the combination of means for supplying metal particles in measured amounts to the melting chamber, a ring flange mounted on top portions of the furnace walls, and a cylindrical inner wall portion of said ring flange defining a central opening therethrough, a closure head having spaced-apart top, bottom and side wall portions defining a cooling fluid chamber therein, said closure head being mounted within the central opening of said ring flange and its side wall portion being cylindrical and rotatably mounted with respect to the cylindrical inner wall portion of said ring flange, means projecting from said closure head into engagement with the cylindrical inner wall portion of said ring flange to hold said closure head in position therewithin during rotative movement of said closure head with respect thereto, electric arc-producing electrodes extending downwardly through said closure head and across the cooling fluid chamber therein into the melting chamber, each of said electrodes having a heat resistant angle-shaped arc-producing tip, means supplying electrical energy of one potential to said electrodes and of opposite potential to metal in the furnace to establish an arc between said tips and the metal in the furnace and progressively build up an ingot therein, means operatively connected to said closure head to rotate said head and said electrodes within said ring flange to move said tips and the arcs produced thereby about a molten surface portion of the ingot, means operatively connected to said electrodes for progressively retracting them from the melting chamber as the ingot is built up therein, and means providing a positive fluid seal between said ring flange and said closure head and about portions of said electrodes that project above said closure head to seal-off fluid flow during the rotation of said closure head and the retracting movement of said electrodes.

13. A melting furnace as defined in claim 12 wherein said ring flange has spaced-apart wall portions defining an annular cooling fluid chamber therein.

14. In a furnace apparatus provided with walls defining a melting chamber in which a metal ingot is to be built up, the combination of means about the furnace walls for cooling them during the melting operation, means for introducing metal particles into the melting chamber, an upper head and a lower closure head positioned in a spaced-apart relationship, said lower closure head being rotatably mounted on top portions of the furnace walls, electric arc-producing means extending from said upper head through said lower head into the furnace chamber to melt the furnace particles and build up an ingot therein, enclosing walls defining a cooling fluid chamber within said lower closure head, an outer tube secured between said upper and lower heads for positioning said upper head on said lower head and defining a cooling fluid passageway therealong that is connected to the cooling fluid chamber of said lower closure head, an inner tube secured in a spaced-relationship within said outer tube and defining a fluid passageway that is connected to the cooling fluid chamber of said closure head, means for introducing cooling fluid along one of the passageways to the cooling fluid chamber and for exhausting heated fluid along the other passageway from the cooling fluid chamber, cap means rotatably supporting an upper end of said outer tube, and a cooling fluid sealing-off means secured between said outer tube and said cap means to maintain a fluid sealing-off relationship therebetween when said outer tube is rotated with said closure head and within said cap means.

SCHUYLER A. HERRES.

References Cited in the file of this patent

UNITED STATES PATENTS

| Number | Name | Date |
|---|---|---|
| 586,822 | Patten | July 20, 1897 |
| 1,433,541 | Freedman et al. | Oct. 31, 1922 |
| 1,512,271 | Burgess | Oct. 21, 1924 |
| 1,529,943 | De Rouvre | Nov. 17, 1925 |
| 2,205,857 | Kroll | June 25, 1940 |
| 2,303,973 | Armstrong | Dec. 1, 1942 |
| 2,325,521 | Lambert | July 27, 1943 |
| 2,370,467 | Hopkins | Feb. 27, 1945 |
| 2,406,147 | Hopkins | Aug. 20, 1946 |
| 2,441,416 | Hopkins | May 11, 1948 |
| 2,541,764 | Herres et al. | Feb. 13, 1951 |

OTHER REFERENCES

Rand, "Titanium and Titanium Base Alloys" Rand Corp., Santa Monica, Calif., March 15, 1949, pages 7, 8, 49–58.

Parke et al., "Metal Technology" #2052, vol. 13, Sept. 6, 1946.